May 10, 1966   M. C. WIELAARD ET AL   3,250,332
MACHINE FOR PULLING BEETS AND SIMILAR CROP
Filed Oct. 15, 1962   2 Sheets-Sheet 1

Marinus C. Wielaard,
Willem A. Wielaard and
Marein Ossewoort,
INVENTORS

BY Wenderoth, Lind
and Ponack,
Attorneys

Marinus C. Wielaard,
Willem A. Wielaard &
Marin Ossevoort,
INVENTORS

BY Wenderoth, Lind
and Ponack.
Attorneys

United States Patent Office 3,250,332
Patented May 10, 1966

3,250,332
MACHINE FOR PULLING BEETS AND
SIMILAR CROP
Marinus Cornelis Wielaard, Sluitgatweg 20 (N.O.P.),
Nagele, and Willem Anthonie Wielaard, Trekweg 31,
and Marein Ossevoort, Trekweg 177, both of Apeldoorn, Netherlands
Filed Oct. 15, 1962, Ser. No. 230,514
Claims priority, application Netherlands, Oct. 17, 1961,
270,321
3 Claims. (Cl. 171—58)

The present invention relates to a machine for pulling beets and similar crop, of the type adapted to be secured to the lifting mechanism of a tractor, and comprising two crop-engaging wheels or discs so disposed relative to each other as to form a V and, in harvesting, rolling along with their rims in the ground of the field, which wheels or discs lift the beets out of the ground and throw them on to a conveyor disposed behind such wheels or discs.

In working with such beet pulling machines, which are known in the art, the drawback is experienced that considerable amounts of earth or clay adhere to the beets or other, similar, crop lifted out of the ground between the crop-engaging wheels or discs, so that the beets have first to be passed over a cleaning device, when, however, not only the clods are removed, but often also the thin tail of the beet is broken. This involves a not unimportant loss in yield of beetsugar. A separate cleaning device moreover involves additional costs and an additional weight behind the tractor.

To remedy this drawback it is known to provide a beet harvesting machine of the above type with two power driven wheels, preceding the beet-lifting wheels, said power driven wheels being adapted to engage the beets on both sides at about ground level and turn the beets about their longitudinal axes so as to strip the hairlike roots anchoring the beet in the soil and at the same time removing clods of soil clinging to the beet.

These power driven wheels, however, increase the size and weight of a normal beet harvesting machine.

A further disadvantage of the known machines is that the crop-engaging wheels are pulled along centrally behind the tractor. As a consequence the ground on both sides of the beets is firmly compressed by the wheels of the tractor, by reason of which it is more difficult for the beets to be pulled from the ground, and greater amounts of earth adhere to the beets.

The invention has for its object to improve the beet pulling machine of the above type.

To this end, according to the invention, the machine is so constructed that the crop-engaging wheels are carried laterally of the tractor, and one of the crop-engaging wheels is positively driven at a higher velocity than that at which the other wheel rolls along over the ground, and in the same general direction.

According to a preferred embodiment of the invention the speed of the driven wheel is adjustable. Also according to the invention the beet harvesting machine is carried laterally of the tractor beyond the planes containing the tractor wheels.

A beet pulling machine according to the invention has various advantages over the prior art harvesters, for example:

The beets are rotated in the soil and lifted clear from the soil in one continuous action by only two wheellike members, of which only one is driven by the tractor. By virtue of the fact that the crop-engaging wheels rotate at different speeds, the beets are rotated about their axes between the wheels as they are pulled from the ground, so that the clods adhering to them are released and the beets are thrown on to the conveyor relatively clean. A cleaning device can thus advantageously be omitted, which implies a saving of costs and weight.

As a result of the fact that the crop-engaging wheels are carried laterally of the tractor, the ground is only compressed on one side of a distance from the beet-bed, so that the beets can still easily be lifted. A set of non-driven crop-engaging wheels carried laterally of the tractor, however, exercises a strongly unilaterally directed braking torque on the tractor, which greatly interferes with the steering of the tractor.

By driving one wheel in the direction of travel, and that at a greater speed than the other, rolling, crop-engaging wheel, such braking torque is eliminated, so that the tractor remains properly controllable.

In illustration of the invention, and only by way of example, an embodiment of the harvester will be described with reference to the drawings, in which FIG. 1 is a diagrammatic plan view of a tractor having coupled to it a beet pulling machine, a conveyor, and a trailer;

Figure 1:
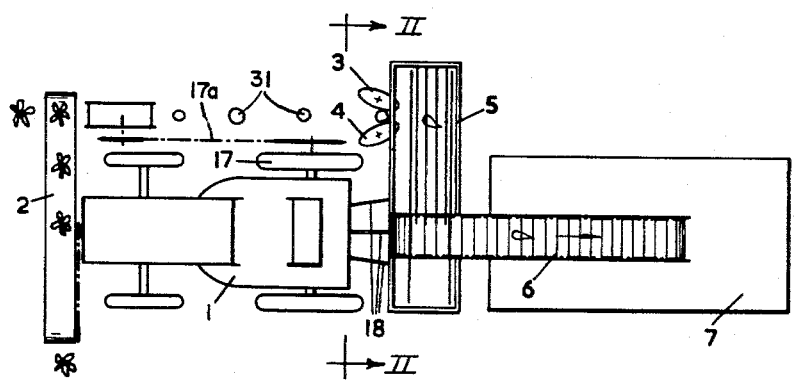
Figure 2:
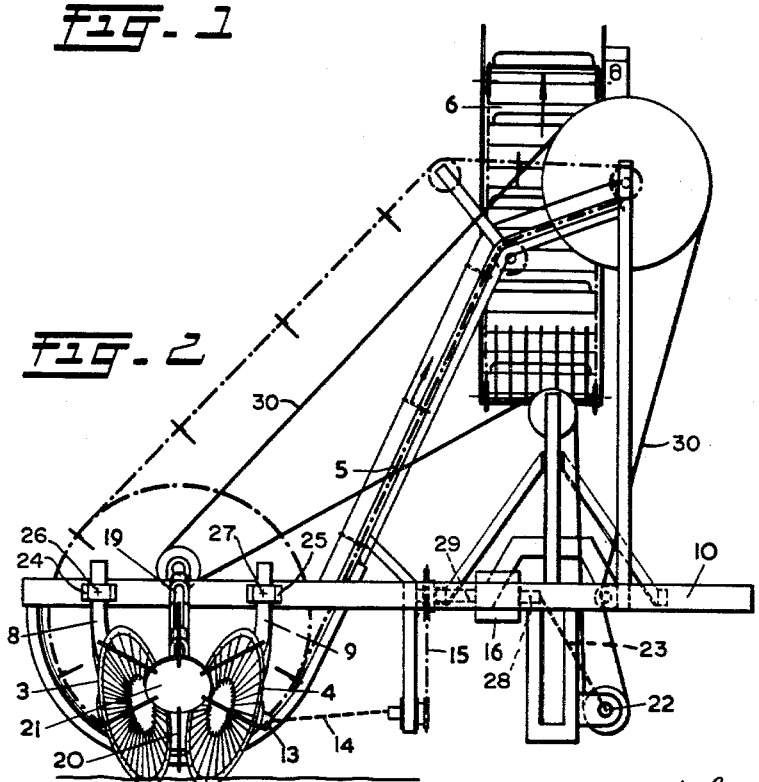
FIG. 2 is a cross-section of the structure along the lines II—II in FIG. 1.
Figure 3:
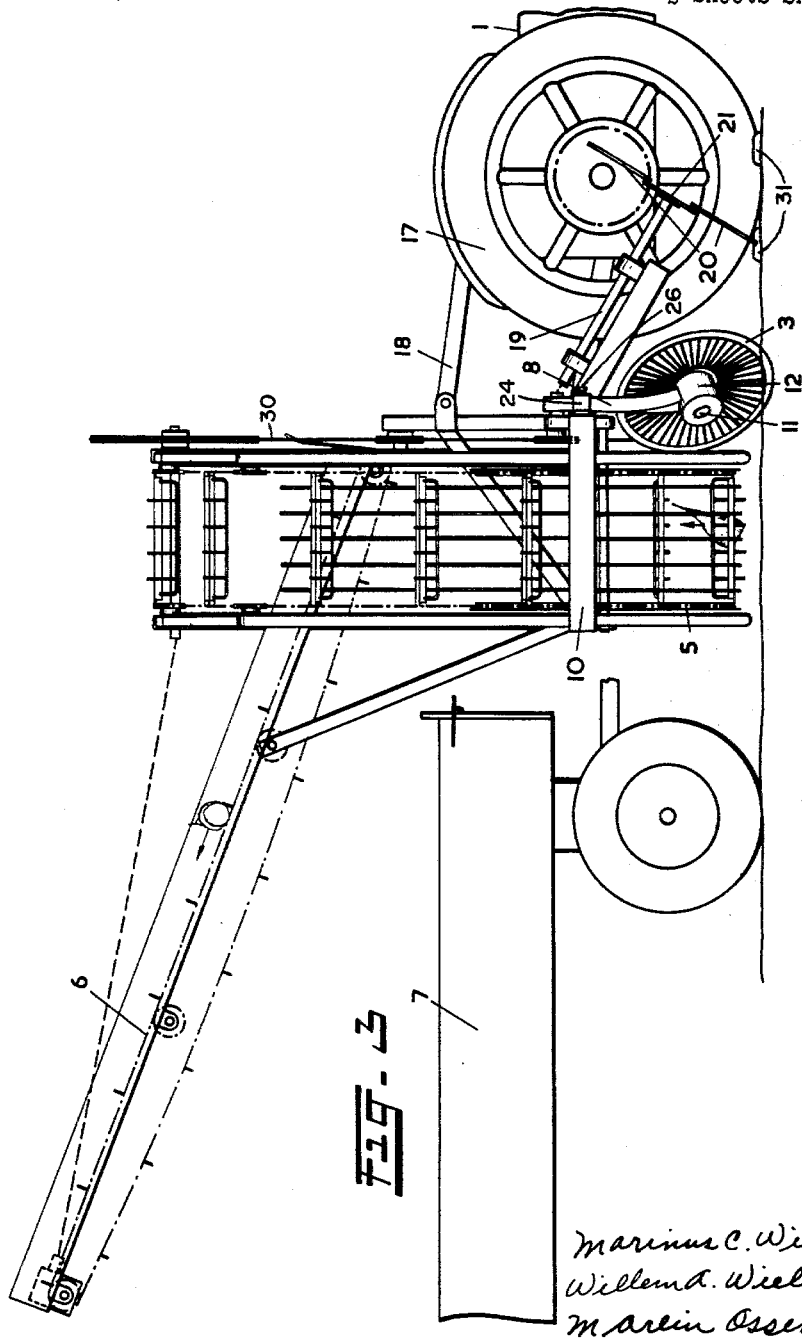
FIG. 3 is a side elevation.

At the forward end the tractor 1 is provided with a conveyor-belt 2 for cut leaves and a beet-leaf cutter 2a, shown diagrammatically to the right of the front wheel of the tractor. As the tractor moves forward the beet-leaf cutter is moved over the row of beets, chops the leaves of the beets and throws them onto the conveyor belt. The rotating cutter is driven from the wheel 17 via a belt or chain indicated by dot-dashline 17a. Neither the conveyor nor the leaf cutter form part of the invention and so they will not further be described.

At the rear end of the tractor a beet pulling machine is carried, comprising two diverging crop engaging wheels 3 and 4, behind which a beet lift conveyor 5 is attached for receiving the beets from the wheels 3 and 4 and carrying them upwards, whence they are dropped onto a second conveyor 6 transporting the beets onto a trailer 7, which may be drawn beside the tractor or preferably be coupled behind the tractor (coupling not shown).

The crop-engaging wheels 3 and 4 are mounted on a carrying frame 10 by means of supports or arms 8 and 9 clamped in bushes 24 and 25 respectively of the carrying frame 10 by way of clamping screws 26 and 27 respectively. Thus the wheels 3 and 4 are adjustable in a vertical plane relative to the carrying frame. The carrying frame can be coupled to the tractor by means of levers 18 pivoting in a vertical plane.

The axle 11 of the wheel 3 can rotate freely in a bushing 12 carried at the end of arm 8.

The axle 13 of the wheel 4 is driven by the take-off shaft 22. The transmission from shaft 22 to the axle 13 is indicated diagrammatically by dotted lines 23 via shaft 28, 29 (connected by speed regulator 16) a sprocket-wheel transmission, indicated by dot-dash line 15, and a cardan shaft, indicated by dotted line 14.

Depening upon the hardness of the ground (wet or dry earth), the speed of the driven wheel relative to the non-driven wheel should be higher or lower. If the ground is very wet, the speed of the driven wheel should be about twice as high as that of the wheel rolling through the ground. On the other hand, experiments have shown that in case the ground is dry, the relative speed of the driven wheel should be lower than in case of the ground is wet. In order to enable the operator to adjust the proper relative speed of the driven wheel for any ground condition, a speed regulator 16 is provided between the take-off shaft and the sprocket transmission to the crop-engaging wheel.

Centrally above the two crop-engaging wheels is disposed a downwardly inclined shaft 19, directed to the front, which shaft carries at the front end a so-called "head-cleaner," a disc 21 provided with rubber spokes 20, which is rotated when travelling and removes any clods, leaves or dirt from the heads of the beets projecting above the ground. The shaft 19 is driven by the take-off shaft 22 via a driving belt 30.

The device operates as follows.

The tractor is driven along a row of beets while care is taken to keep the beet leaf cutter just over the beets so as to chop off the top and leaves of each beet. The next moment the beets are caught one by one between the wheels 3 and 4. As the inner wheel 4 is rotated at a speed higher than the rolling speed of the outer wheel 3 each beet is rotated about its axes before being lifted out of the soil, so that the clods adhering to the beet are swept off and the beets are thrown onto conveyor 5 relatively clean. A cleaning device can thus advantageously be omitted saving costs and weight of the beet harvester.

Owing to the fact that the crop-engaging wheels are carried laterally of the tractor the ground is only compressed at a distance on one side of the beetrow so that the beets can easily be lifted out of the ground.

If, however, a set of non-driven but rolling crop-engaging wheels are carried sideway of the tractor a strongly unilateral braking torque is exercised, which greatly interferes with the steering of the tractor.

By driving one wheel in the direction of travel and that at a greater speed than the other non-driven wheel such braking torque is eliminated so that the tractor remains properly controllable.

We claim:

1. An apparatus for harvesting beet and similar taproot crops to be pulled by a tractor or the like, comprising two wheelshaped crop-engaging members disposed relative to each other so as to form a V, said members, during harvesting, rolling along with their rims in the ground and engaging one on each side of a beet in order to lift the beet out of the ground and onto a conveyor, an axle on which one of said wheelshaped members is freely rotatable, and means driving the other member positively in the same direction as said first named member at greater speed than the speed at which said first named wheel rolls along the ground.

2. An apparatus as claimed in claim 1, wherein the speed of said driven crop-engaging member is adjustable.

3. An apparatus as claimed in claim 1 wherein said crop-engaging members are carried laterally of said tractor beyond the planes containing the wheels of said tractor.

References Cited by the Examiner
UNITED STATES PATENTS

| | | | |
|---|---|---|---|
| 2,751,739 | 6/1956 | Paul | 171—58 X |
| 2,791,076 | 5/1957 | Richardson | 171—61 X |
| 2,973,816 | 3/1961 | Van der Lely | 171—58 |

ABRAHAM G. STONE, *Primary Examiner.*

ANTONIO F. GUIDA, *Examiner.*